Sept. 17, 1957 W. R. ROWBOTHAM ET AL 2,806,338
MOWER STRUCTURE WITH LINKAGE FOR LIFTING
AND GAGGING MOWER BAR
Filed Dec. 12, 1955 2 Sheets-Sheet 2
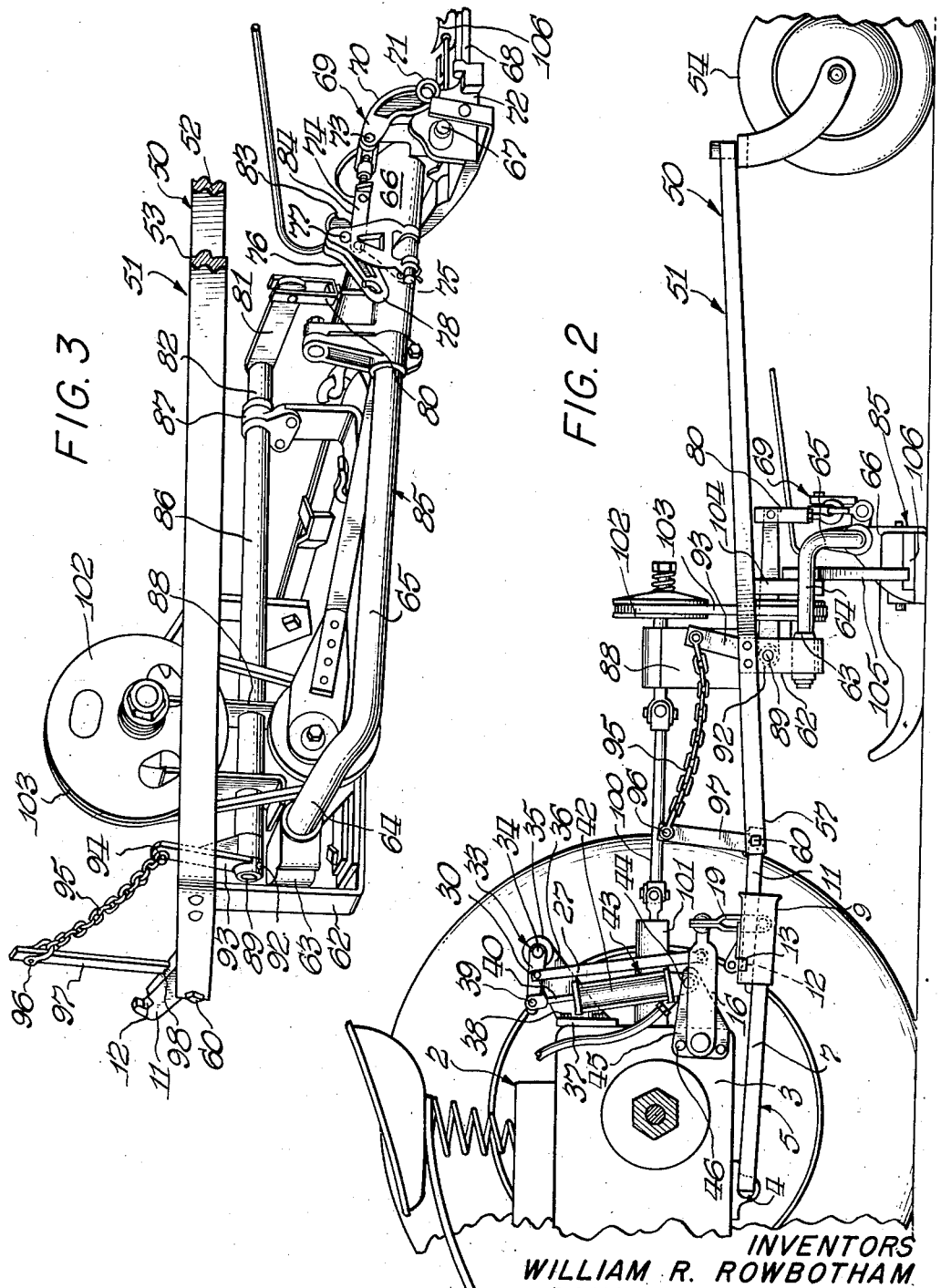
INVENTORS
WILLIAM R. ROWBOTHAM
DONALD A. McCALLUM
Paul O. Pippel
ATTORNEY

United States Patent Office 2,806,338
Patented Sept. 17, 1957

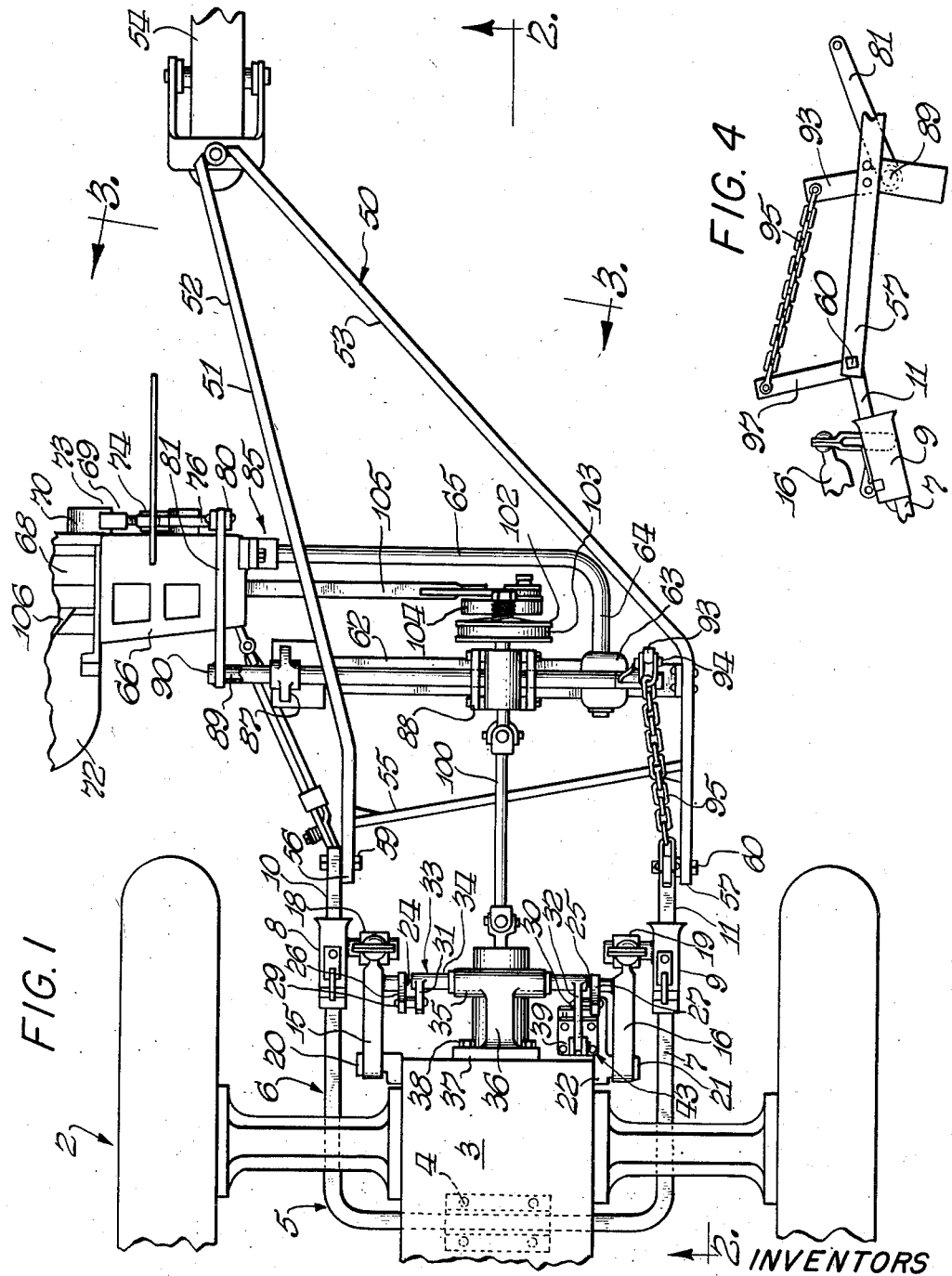

2,806,338

MOWER STRUCTURE WITH LINKAGE FOR LIFTING AND GAGGING MOWER BAR

William R. Rowbotham, Hamilton, Ontario, and Donald A. McCallum, Burlington, Ontario, Canada, assignors to International Harvester Company, a corporation of New Jersey Application December 12, 1955, Serial No. 552,391

6 Claims. (Cl. 56—25)

This invention relates to mowers and more specifically to novel operating means therefor.

The general object of the invention is to provide a novel mechanism for gagging and lifting the mower bar for transport which is of simple and economical design and rugged construction for durable life and efficient trouble-free service.

A more specific object of the invention is to provide a novel gagging and lifting linkage mechanism which comprises a drawbar which is associated with a lifting device and is attached therewith in trailing relation to the tractor and which is swingable upwardly and downwardly by the lifting device, the drawbar having a pivotal connection with the frame of an associated mower whereby upon lifting and lowering the drawbar and the mower frame jackknife, the drawbar having an upstanding arm associated therewith which is adapted to connect to the dead end of the conventional mower lifting and lowering linkage and the arm being swingable up and down with respect to the mower frame and rotatable about the axis of connection between the mower frame and the drawbar and effective to exert a pulling force on the linkage to operate the same for moving the mower.

These and other objects of the invention will become more apparent from the specification and the drawings, wherein:

Figure 1 is a fragmentary plan view of a tractor and mower combination incorporating the invention;

Figure 2 is a sectional view taken substantially on the line 2—2 of Figure 1;

Figure 3 is a rear perspective view on an enlarged scale taken substantially on the line 3—3 of Figure 1; and Figure 4 is a fragmentary side elevational view showing the parts in lifting position as respects the mower.

Describing the invention in detail, the tractor generally designated 2 has a rear end portion 3 to which is trailingly pivoted as at 4, on a transverse axis, a drawbar or draft hitch structure generally indicated 5, said drawbar having a front portion including a pair of legs or links 6 and 7 which are disposed in trailing relation to the tractor, and the rear ends of the legs 6 and 7 being provided with sockets 8 and 9 wherein are telescoped and releasably interlocked the draft or hitch links or members 10 and 11 which form the rear portion of the drawbar structure. The hitch members are each notched as at 12 (Figure 2) and the locking lug 13 is sprung thereinto. It will be appreciated that members 10 and 11 move up and down with the drawbar 5, the drawbar 5 being actuated by the arm members 15 and 16 which are pivotally interconnected with the legs 6 and 7 through the linkages 18 and 19. The arms 15 and 16 are pivotally mounted as at 20 and 21 on coaxial pivots provided on a mounting structure 22 which is carried by the tractor rear end portion 3. The arms 15 and 16 may be pivotally connected as at 24 and 25 to the lower ends of links 26 and 27, which at their upper ends are pivotally connected as at 29 and 30 to the arms 31 and 32 intermediate their ends, the arms 31 and 32 being mounted at opposite ends of the rockshaft structure 33, the said rockshaft structure being supported above the arms 15 and 16 and comprising a shaft 34 which is rotatably mounted within a bearing 35 and the bearing being mounted on a standard 36 which is provided with a base portion 37 bolted as at 38 to the trailing or rear portion 3 of the tractor.

The arm 32 may have its forward end pivotally connected as at 39 to the upper end of the piston 40 which is operative within a cylinder 42 of the lifting device generally designated 43, and the cylinder 42 being pivoted as at 44 to an anchor member 45 which is suitably connected by bolts 46 to the adjacent portion of the tractor. It will be understood that the hitch structure shown in the instant design is merely illustrative and in no way is limiting of the invention and that for purposes of the present invention all that is required is any type of a drawbar which moves up and down pivotally.

As best seen in Figures 1 and 2, the mowing or cutting machine generally indicated 50 comprises a main frame structure 51 which includes a pair of side beams 52 and 53 which converge rearwardly and at their rear end are connected to and mount a ground support in the form of a caster-wheel structure 54. The members 52 and 53 are interconnected by cross member 55 adjacent to their forward ends and the forward ends 56 and 57 of the side members of the main frame are intercalated with the draft members 10 and 11, and the members 56 and 10 are connected on a generally horizontal transverse axis by a bolt and nut assembly 59 and similarly the members 11 and 57 are interconnected on a transverse generally horizontal axis by a nut and bolt assembly 60 substantially coaxial with the nut and bolt assembly 59, whereby the drawbar structure and the mower bar frame are adapted to jackknife, as best seen in Figures 2 and 4, attendant to lowering or lifting of the drawbar assembly.

The mower structure comprises a mounting beam 62 which is interconnected with the frame members 52 and 53 and supports a bearing structure 63 adjacent to its stubbleward side on which is mounted the fore and aft extending end portion 64, on a rearwardly generally horizontal axis, of a second frame member or structure or coupling arm 65 which extends transversely laterally of the tractor and the mower frame and in normal position extends diagonally outwardly and downwardly and the lower end of the coupling arm 65 being provided with and connected to a yoke structure 66 which pivotally mounts as at 67 (Figure 3) on a substantially horizontal fore and aft extending axis the mower bar or cutter-bar 68 which is adapted to swing from a substantially horizontal position to a substantially upright folded position pursuant to actuation of the operating linkage 69 which is of conventional construction and the same including a lifting link 70 which is connected as at 71 to the mower bar inner shoe structure 72 at a point outwardly of the axis 67 and the link 70 having its upper end 73 pivoted to a strap assembly 74 which is pivotally connected as at 75 to the lever 76, the lever 76 being pivoted intermediate its end as at 77 and adapted to be swung with its inner end 78 upwardly in order to pull the strap assembly 74 inwardly and thereby pull the linkage 70 upwardly and to swing the mower bar 68 upwardly attendant to the link 80 being lifted by the rearwardly extending arm 81 of the rockshaft assembly 82. It will be understood that upward swinging of the mower bar 68 will continue until the stop 83 on the outer end of lever 76 engages with the upper edge 84 of the strap linkage 74 whereupon rotation of the lever 76 ceases and the entire mower assembly generally indicated 85 is swung upwardly about the axis of the end portion 64 of the coupling arm 65.

The rockshaft 82 may comprise an outer tube structure 86 which is suitably mounted upon and connected to a plurality of carriers 87 and 88 which are mounted upon the transverse beam or shelf 62. The tube 86 rotatably supports a shaft 89 which is weld connected at one end as at 90 to the arm 81 and the opposite end is preferably pinned as at 92 to the lower end of an upstanding normally diagonally rearwardly and upwardly projecting arm 93. The arm 93 has its upper end pivotally connected as at 94 to the rear end of a lost motion linkage 95 which includes, in the present instance, a chain and the chain 95 having its forward end pivoted as at 96 to the upper end of an upstanding arm 97 which at its lower end is integrally connected, preferably as by welding, at 98 to the rear end of the draft tongue member 11 and rotatable therewith about the axis of the bolt 60 and extending radially therefrom.

It will be readily evident that upon the raising of the drawbar resulting from the lifting actuation of the piston and cylinder assembly 43 the drawbar will swing upwardly and the parts will assume the position shown in Figure 4, whereat the lifting arm 97 will swing forwardly and also lift upwardly with the attendant jackknifing between the drawbar and the mower frame. This effects tension in the chain 95 initially and then a swinging in a counter-clockwise direction (Figure 4) of the rockshaft assembly with attendant lifting of the operate arm 81 of the rockshaft whereby the linkage 80 is lifted and the lever 76 rotated in a clockwise direction (Figure 3), the strap assembly 74 being pulled inwardly, that is to the left, and the linkage 70 moved upwardly and the mower bar swung about the axis 67 in a counter-clockwise upward direction.

Assuming that the parts for the mechanism are in the position shown in Figure 4, in order to lower the mower bar the lifting device 43 is actuated to lower the hitch device whereupon the hitch is swung downwardly and the member 97 is swung rearwardly whereupon chain 95 moves rearwardly (Figure 2) and the arm 93 swings in a clockwise direction which also swings the arm 81 in a clockwise downwardly moving direction so that the linkage 80 moves downwardly, the lever 76 rotates in a counter-clockwise direction (Figure 3) and the strap assembly 74 moves rightwardly whereby the member 70 moves downwardly with attendant downward swinging movement of the mower bar 68 about the axis 67.

It will be noted that the forward and rear parts of the drawbar structure as represented respectively by the parts 5, 10 and 11 are readily separable and that the actuating mechanism for the mower bar is entirely contained on the rear part and the mower frame so that disconnection of the drawbar separates the mower and the operating mechanism from the tractor. The drive represented by shafting 100 which splines into the power take-off structure 101 also separates and the drive is carried by the carrier 88 and drives the pulley 102 which drives belt 103 which in turn drives the crank wheel 104 carried upon carrier 88. The crank 104 drives the pitman 105 which is connected to drive the sickle 106.

What is claimed is:

1. In combination, a tractor having a vertically swingable drawbar, power means for raising and lowering said drawbar structure operatively associated therewith, a rigid mower frame having a ground engaging trailing support, means pivotally connecting said mower frame with said drawbar structure whereby said frame and structure are caused to jackknife attendant to swinging of the drawbar, a cutter frame pivotally supported on said mower frame for movement in a substantially vertical plane, an upright arm rigidly secured to said drawbar and terminating in a free end, and mechanism on said mower frame operatively connected to the said free end of said arm and to said cutter frame for pivoting the latter attendant to raising and lowering for said drawbar.

2. The invention according to claim 1 and wherein said drawbar comprises portions separably connected to each other, and said means pivotally connecting said drawbar structure with said mower frame located between one of said portions and said mower frame, said one portion connected to said mower frame, and said arm connected to said one portion whereby disconnecting of said one portion from the other portion disconnects the entire mowing machine including said mechanism from the tractor.

3. The combination of a tractor having a drawbar and having provision for supporting the drawbar for vertical movement, of a mowing machine having a ground supported frame trailingly connected to the drawbar on a substantially horizontal transverse axis for jackknifing relative thereto incidental to upward and downward swinging movement of the drawbar, said mowing machine having a cutter bar assembly, a pivotal mounting for the cutter bar assembly upon said frame enabling vertical swinging movement of the cutter bar assembly between substantially horizontal and vertical positions, an upstanding arm secured to the drawbar and terminating in an upper end, and mechanism having an operative connection between said upper end of the arm and said cutter bar assembly for swinging the cutter bar assembly in an upward direction in response to upward movement of the drawbar.

4. The invention according to claim 3 and wherein said arm extends radially from the axis of connection between said drawbar and said frame.

5. The invention according to claim 3 and further characterized in that said drawbar includes a pair of trailing link members and having readily releasable rear end connecting means, and draft links releasably connected to said releasable means and extending rearwardly therefrom and pivoted to said frame on said axis.

6. In a mower attachment for a tractor having a draft link trailingly pivoted on its rear end portion and connected to a power lift device on the tractor for vertical swinging of such link by said device, the combination of a draft member, means releasably interconnecting said member with said link as a rearward extension of the latter for haulage as well as bodily lifting movement of the same, a frame disposed in trailing relation to said member and having a wheeled rear end ground support, means pivotally connecting said draft member with said frame on a transverse generally horizontal axis, a mower bar, means including an arm pivotally connected to and pivotally mounting said mower bar on the frame for vertical movement with reference to the arm and to said frame, a lever mounted on the frame for fore and aft rocking movement thereon and having a first upwardly extending leg and a second rearwardly extending leg, means operatively interconnecting said second leg to said mower bar for upwardly moving in sequence said bar from a substantially horizontal position and then said bar and said arm together, an upright lifting member rigidly connected to said draft member, and lost motion means connecting said first arm with said lifting member.

No references cited.